(12) United States Patent
Shelef et al.

(10) Patent No.: US 9,194,531 B2
(45) Date of Patent: Nov. 24, 2015

(54) KINEMATIC MOUNT

(76) Inventors: Ben Shelef, Mountain View, CA (US); Shmuel Erez, San Jose, CA (US)

(*) Notice: Subject to any disclaimer, the term of this patent is extended or adjusted under 35 U.S.C. 154(b) by 803 days.

(21) Appl. No.: 13/032,607

(22) Filed: Feb. 22, 2011

(65) Prior Publication Data

US 2011/0206453 A1 Aug. 25, 2011

Related U.S. Application Data

(60) Provisional application No. 61/306,551, filed on Feb. 22, 2010.

(51) Int. Cl.
*F16M 7/00* (2006.01)
*F16M 11/04* (2006.01)
*F16M 11/12* (2006.01)

(52) U.S. Cl.
CPC ............... *F16M 7/00* (2013.01); *F16M 11/041* (2013.01); *F16M 11/121* (2013.01); *Y10T 403/74* (2015.01)

(58) Field of Classification Search
CPC .................................................... F16M 11/041
USPC ............... 403/121, 122, 13, 124; 248/288.31, 248/288.51, 181.1, 481; 359/811–830
See application file for complete search history.

(56) References Cited

U.S. PATENT DOCUMENTS 4,770,497 A * 9/1988 Brown ........................... 359/896
2006/0232837 A1 * 10/2006 Shelef ............................... 359/1

* cited by examiner

*Primary Examiner* — Daniel Wiley
(74) *Attorney, Agent, or Firm* — Nixon Peabody LLP; Joseph Bach, Esq.

(57) ABSTRACT

A kinematic mount in which mobile spheroid bodies belonging to one component mate with conical depressions in a second component. The mobility of the spheroid bodies is achieved using round shafts and tight-fitting holes.

18 Claims, 7 Drawing Sheets

Section A-A of Figure 1

Section A-A of Figure 1

KINEMATIC MOUNT

CROSS-REFERENCE TO RELATED APPLICATIONS

This application claims priority from U.S. Provisional patent application Ser. No. 61/306,551, filed on Feb. 22, 2010, the entirety of which is incorporated herein by reference.

FIELD

The present application relates to the field of mechanical kinematic mounts

BACKGROUND

A kinematic mount is a coupling of two mechanical components (referred to in this application as A and B) that constrains all and only the possible degrees of freedom between them. For the case of two free rigid bodies in three dimensions, there are six degrees of freedom between them. When components are kinematically coupled, the coupling is stress-free and repeatable.

Kinematic couplings are old art. For example, if component A has three spherical protrusions, and component B has a flat area, a conical depression, and a V-groove depression, and if the spherical protrusions of component A fit onto the features of component B, then there is only one spatial relation between the components under which the spherical protrusions are tangent to the features of component B, and a kinematic mount is formed—the conical depression eliminates three degrees of freedom, the V-groove eliminates two degrees of freedom, and the flat area eliminates the last of the 6 degrees of freedom. This mount is commonly known as a 3-2-1 mount, or a cone-V-flat mount. (The term "3-2-1" is also sometimes used to refer to a three-sided kinematic mount consisting of six points—this is not what this description refers to.)

A similar scheme is the 2-2-2 mount, in which three spherical protrusions in component A fit into three V-groove depressions in component B, eliminating 2 degrees of freedom each. This mount is called a three-groove mount. It has an advantage over the 3-2-1 mount in that its three component mates are identical, and so the mount is symmetrical.

It is important to note that the precise location of the features does not matter—as long as the protrusions fall anywhere within their respective mating feature, the mount will be kinematic. This means that there is no need to require tight manufacturing tolerances to achieve the stress-free, repeatable, and rigid coupling. The tolerances on the shape of the individual mounting features (spheres, cone, V-groove, flat) are assumed to be much tighter than the positional tolerances of the features and so is assumed to be perfect. For example, the cone is assumed to touch the sphere along a circle (whereas an imperfect cone would touch the sphere in three points.) This is a practical assumption, since it is relatively easy to achieve these tolerances.

For the same reason, changes in the geometry caused by thermal expansion do not affect the kinematicity of the mount—the components are not over-constrained, and while their spatial relationship may shift, no internal stresses will develop.

A common issue with kinematic mounts is that they often involve point contacts, as in the contact between a spherical protrusion and a V-groove. Point contacts are limited in the amount of load they can hold. Beyond a certain limit, the stress concentration permanently deforms the mating surfaces, and the deformed parts no longer function properly.

In U.S. Pat. Nos. 6,729,589 and 7,173,779 is described a mating body geometry comprised of spherical and cylindrical surfaces that interface a V-groove and a conical depression without creating point contacts, only line contacts. The bodies can then be used in either a cone-V-flat or a three groove mount, greatly increasing their load capacities. The V-groove is more difficult to machine, since it is not a feature of rotation.

SUMMARY

Embodiments of this invention are based on a novel geometry that uses a bead-like mobile body and a conical surface to achieve a mechanical mating that eliminates 2 degrees of freedom. The utility of the geometry is the ability to create a kinematic mount based on this mating that can carry large loads without being damaged. This new geometry is easy to fabricate, since all the mating surfaces are features of rotation. It also allows the incorporation of a retainer that prevents the mount from separating under dynamic loads.

DETAILED DESCRIPTION

In this specification, the term "Bead" refers to a solid body that has either a spherical surface or a surface partial to a sphere. A partial surface is sufficient since it only has to extend around the region of intended mechanical contact. In the case of contact with a cone, this area is a band around the circle that is formed by the intersection of the cone and the sphere. The bead is assembled on a shaft, allowing it to slide back and forth along the direction of the shaft.

Also in this application, the term "Conoid" refers to a regular cone, a Roman Arch cone where the generatrix of revolution is not a straight line but an eccentric arc, or any similar partial surface of revolution around an axis whose radius changes monotonously with respect to its axis of revolution, or a surface partial to any of these.

Whichever variation is used, the key property required is that contact between the Bead and the Conoid is nominally a circular line or portion thereof, lying in a plane perpendicular to the axis of the Conoid, and centered on it, so that the Conical surface can rotate in all three axes around the center of the Bead over some finite range of angles. (tip, tilt, and spin)

The mating between the Bead and the Conoid eliminates two degrees of freedom—the two linear translations that are perpendicular to the axis of the shaft. In this application the "CB Pair" refers to a matched pair of Conoid and Bead. Mating surfaces can be made from hardened metals such as steel or from hard ceramics or carbides, but can also be made from softer materials such as Aluminum or plastics.

Figure 1:
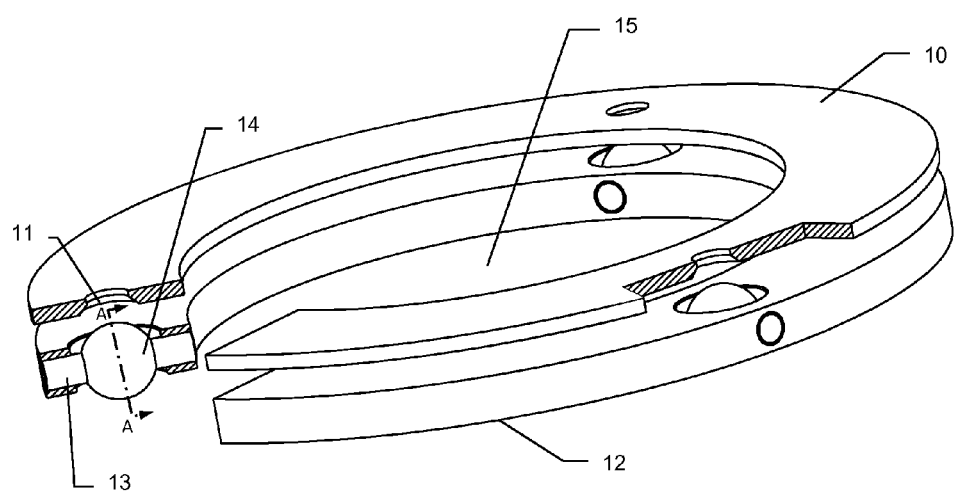
FIG. 1 shows an embodiment of the mount with partial cross section

FIG. 1 depicts the composition of the mount in its preferred 2-2-2 embodiment. Component A [10] has three Conoid depressions [11]. Component B [12] has three shafts [13] attached to it, located in a pattern that approximately matches the Conoid depressions, and pointing roughly towards their common center [15]. Onto each shaft, using a tight-fitting hole, is fitted a Bead connector body [14]. Each Bead is constrained to move on its shaft by a hole formed in its center.

Thus are formed three CB pairs, each eliminating 2 degrees of freedom (The two translational motions perpendicular to the axis of the shaft). The same mating can also be used as the "2" mate in a 3-2-1 mount.

When components A and B are brought together, the Beads slide along the shafts, until all three are able to become tangent to their Conoid surfaces. Only one such configuration is geometrically possible, and once it is achieved, the mount is kinematic and the position of component A relative to component B is uniquely determined.

In this way, the mount functions identically to the 3-groove mount described above, except that the shafts replace the V-grooves and eliminate the ball-groove interfaces. The position of Beads on the shafts (just like the position of the spherical protrusions in the V-grooves) depends on the precise location of the Conoids and shafts, which is a function of manufacturing tolerances and thermal conditions.

The amount of travel of the Beads on the shafts must be sufficient to allow the Beads to find a location where their positions exactly matches the positions of the Conoids. The larger the uncertainty in the initial position (E.g. the looser the position tolerance of the Conoids and shafts), the larger the allowed travel has to be in order to allow the mount to function as intended.

The mount will become redundant and non-kinematic if two of the shafts are parallel, or if the axis of one of them coincides with another of them. By pointing the shafts roughly towards the center of a circle passing through them, these scenarios are avoided. In this specification, such a pointing arrangement is called "non-redundant".

Figure 2:
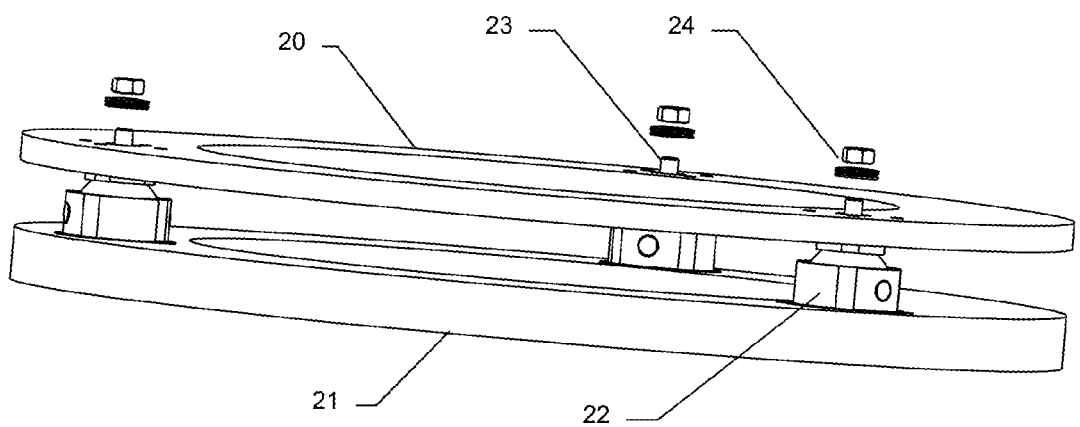
FIG. 2 shows an embodiment of the complete mount using modular CB pairs

FIG. 2 depicts an embodiment of the mount in which the mounting features (The Bead and shaft, and the Conoid) are built into modular connector elements, which in turn attach onto the original components A and B. The assembly therefore consists of component A [20], component B [21], and three modular contact pairs [22]. The modular contact pairs contain the Bead and Conoid surfaces, and are permanently secured to components A and B. This allows components A and B to be generically designed (e.g. simple Aluminum or plastic parts) and the modular contact pairs to be custom made (e.g. precision ground from hardened steel) and supplied separately. Mating therefore occurs between the two halves of each mating pair.

In this embodiment the mount is secured against tensile loads by preloading the CB pairs using optional retainer bolts [23] and spring washers and nuts [24] as they protrude through component A. The spring washers are only tightened down partially, and the resultant elastic "wiggle room" guarantees that the bolt-down does not interfere with the positioning functionality of the CB pairs. The preload on the spring washers must be larger than the expected amount of tensile or dynamic loads to guarantee that the CB pair does not separate.

Figure 3:
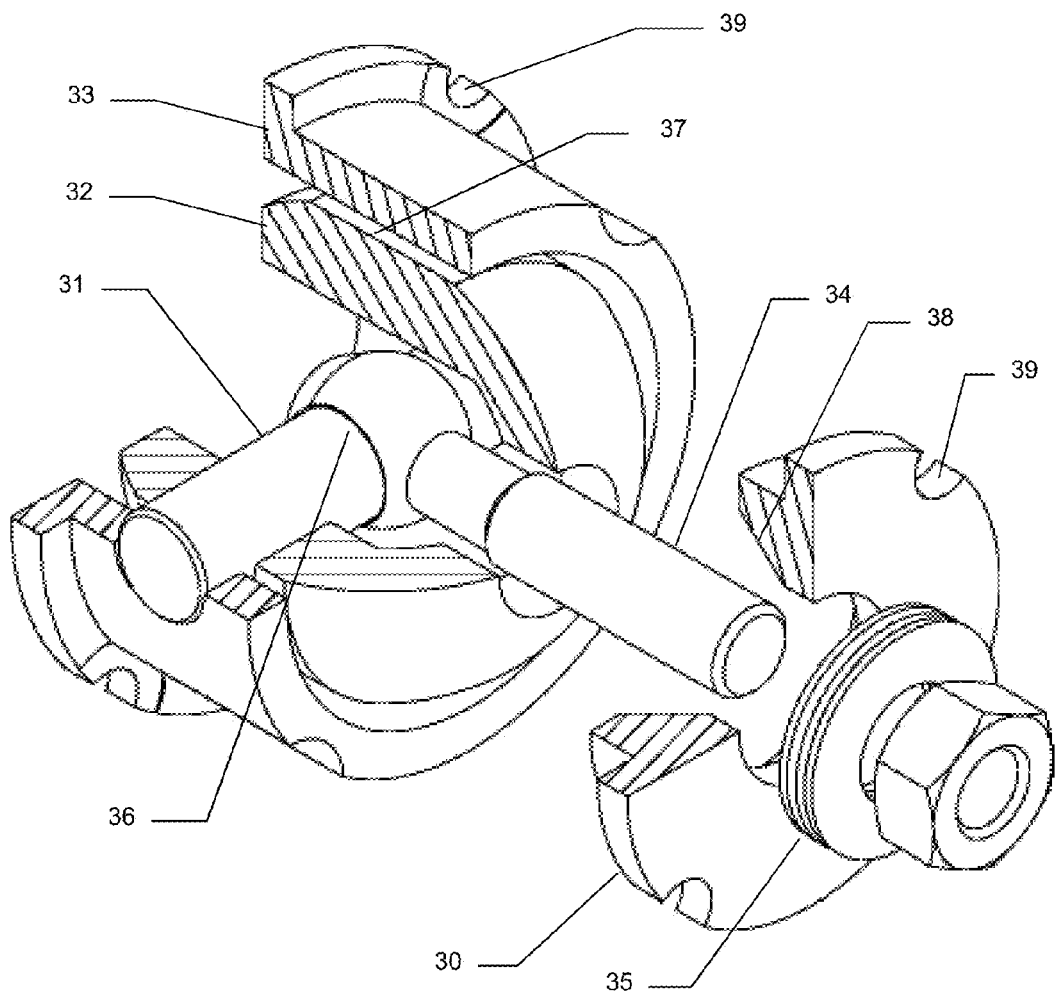
FIG. 3 shows a modular embodiment of one CB pair with a retainer bolt

FIG. 3 shows an embodiment of a single CB pair implemented as modular parts. The two mated components (not shown) are still referred to as components A and B. The conical depression [38] is formed into a Cone Block [30] that is in turn bolted to component A, The Shaft-Bead pair [31,32] are mounted into a Shaft Block [33] that is similarly bolted to component B. The Bead is not a complete sphere but only has a spherical face around the expected contact area with the Conoid. Rotation of the bead is limited by the cylindrical sidewall of the Bead [37] hitting the Shaft Block, preventing the Bead from tilting away too far from its nominal position, so the Conoid always contacts only the spherical surface of the Bead. Attachment of the blocks onto components A and B is achieved using bolt-down features [39], though other fastening methods such as bolts from the back side, bonding, welding, etc. can also be used.

In addition, an optional retainer bolt [34] extends from the shaft through the Cone Block, and allows the contact pair to be preloaded using spring washers [35], so the mount can hold tensile as well as compressive forces. The retainer's shaft hole [36] is tapered from both directions so it is narrower in its middle, allowing the retainer to slightly tilt from being perpendicular to the shaft, to accommodate angular misalignment.

Figure 4:
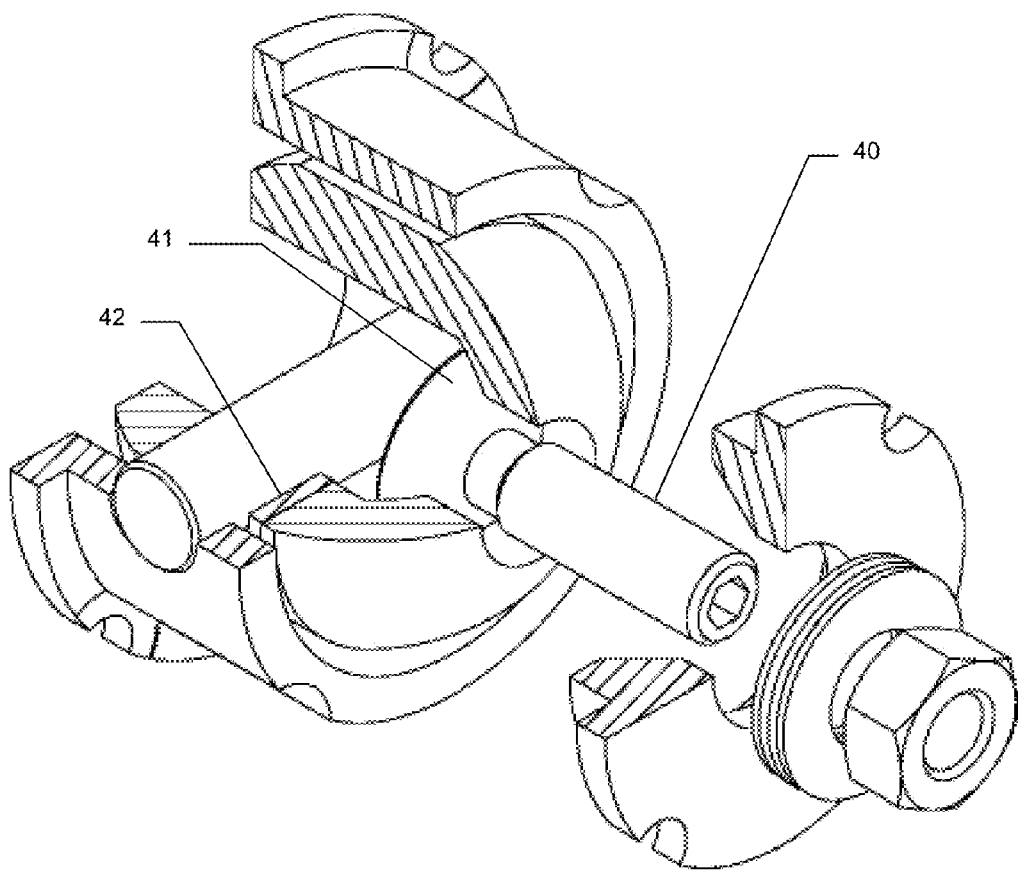
FIG. 4 shows another embodiment of the retainer bolt

FIG. 4 shows an alternative embodiment where the optional retainer bolt [40] is constrained to the Bead rather than to the shaft using a concentric spherical contact surface [41]. This embodiment allows for more angular misalignment, but is susceptible to any rattle that may exist between the Bead and the shaft, since the Bead is not preloaded against the shaft by the force applied by the retainer bolt and spring washers.

As explained above, each Bead is constrained to its axis of motion using a shaft that goes through a hole formed in its center. In the first embodiment, the precision fit between the shaft and the Bead is achieved using a precision ground pin and precision matched-lapped holes. In order to reduce manufacturing cost, other options are possible:

In this embodiment, to reduce any rattle between the shaft and the Bead, a pliable bushing [42] is inserted between the shaft and the Bead so that it is deformed when the shaft is inserted into the hole. The assembled pair then optionally undergoes thermal stress relief in order to remove residual elastic strain. The bushing can be made out of a soft metal such as bronze, other low-temperature alloys or even plastic.

Figure 5:
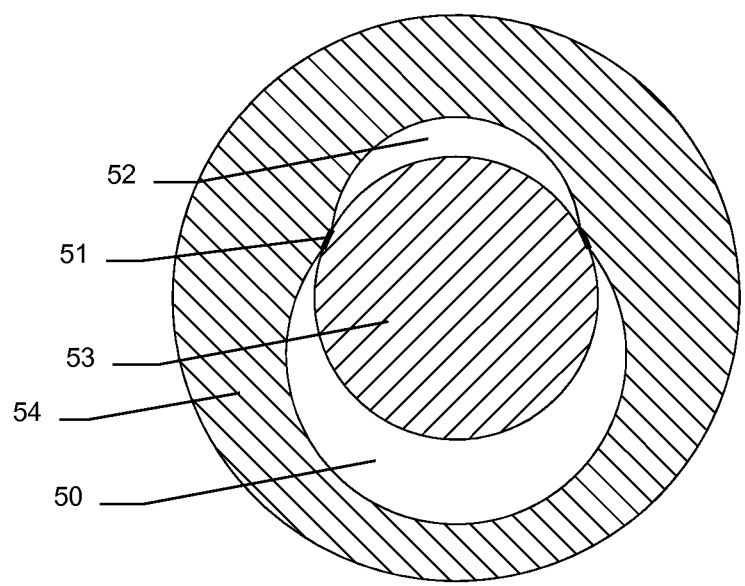
FIG. 5 is a cross section along line A-A of FIG. 1 and shows a 3-hole geometry for constraining the Bead to the shaft
Figure 6:
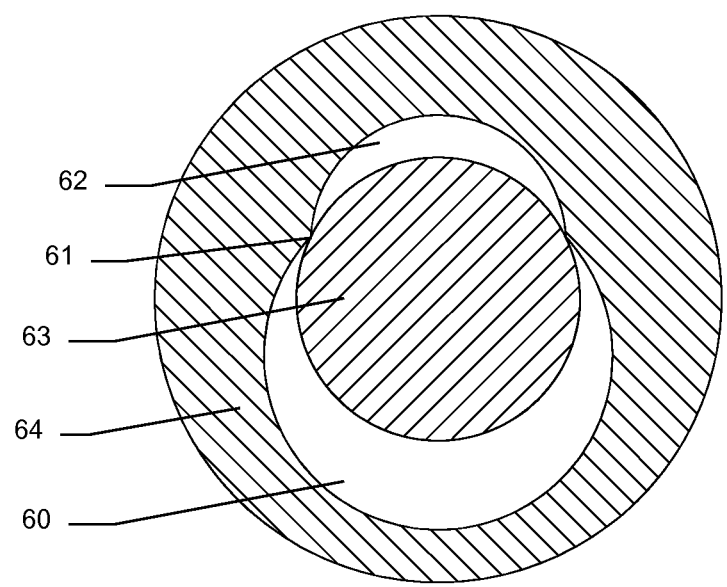
FIG. 6 is a cross section along line A-A of FIG. 1 and shows a 2-hole geometry for constraining the Bead to the shaft

In another embodiment the hole through the Bead is formed as a complex hole made out of three partially overlapping round holes. FIG. 5 shows the cross section of the region of the Bead around the holes. The three holes [50,51, 52] restrict the contact between the shaft [53] and the Bead [54] to occur primarily along two thin bands, which are the remnants of the middle hole [51]. FIG. 6 shows a similar embodiment in which only two round holes are used, [60,62], and contact between the shaft [63] and the Bead [64] occurs along the lines of intersection [61] between them.

Figure 7:
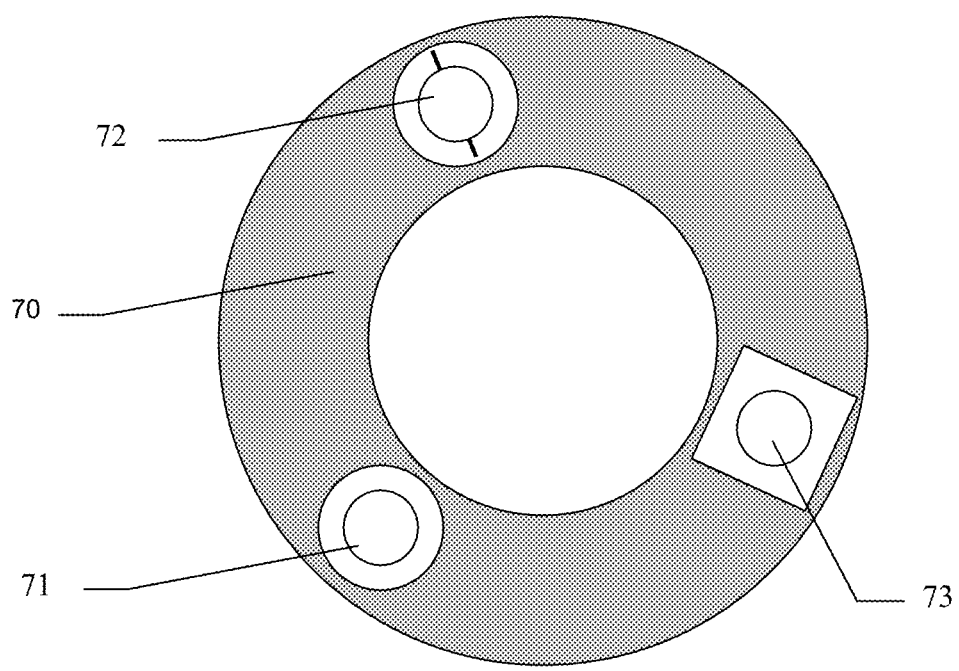
FIG. 7 shows the schematic layout of a 3-2-1 embodiment

FIG. 7 shows a schematic top-view diagram of another embodiment, in which a CB pair is used as the "2" contact point in a 3-2-1 mount. Component A and B overlay each other and are shows as the gray ring [70]. In the first mate [71], component A has a fixed spherical body that fits into a Conoid depression in component B, thus eliminating three degrees of motion. In the second mate [71] is a CB pair, with its shaft oriented so as not to intersect the first contact mate, eliminating two more degrees of freedom. In the third mate [73] component A has a fixed spherical body and component B has a flat surface (shown as a square), thus eliminating the sixth and last degree of freedom.

What is claimed is:

1. A kinematic mount connecting two components comprised of three contact elements, between one and three of said elements comprised of a Conoid depression in the first component and a movable protrusion in the second component, said movable protrusion being comprised of a shaft and a rigid bead body, said shaft rigidly connected to said second component, said bead body having a hole in it encircling the shaft, such that said bead body is configured to move in translation along the direction of the axis of the shaft, wherein all shafts are oriented in a non-redundant configuration.

2. The mount of claim 1, wherein said bead body contacts said Conoid in a tangent manner.

3. The mount of claim 1, where said Conoid depression comprises a separate body fastened to said first component.

4. The mount of claim 1, where said shaft and bead body are part of a separate subassembly fastened to said second component.

5. The mount of claim 1, additionally having a retainer element encircling said shaft and fastened to said Conoid depression through a compliant preloading element, said retainer preventing the mount from separating under tensile load.

6. The mount of claim 1, additionally having a retainer element attached to said bead body and fastened to said Conoid depression through a compliant preloading element, said retainer preventing the mount from separating under tensile load.

7. The mount of claim 1, additionally having a bushing between said shaft and said bead body.

8. The mount of claim 1, wherein said hole is defined by a composition of a plurality of round holes, at least one of which is of a diameter smaller than the diameter of said shaft.

9. The mount of claim 1, additionally having a means of limiting the tilt of said bead body around said shaft so that only spherical surface of the bead body contacts the Conoid.

10. The mount of claim 1, wherein all three contact elements are identical.

11. The mount of claim 1, wherein the hole of said bead comprises a round first hole of a diameter equal or larger than the diameter of the shaft, said first hole intersected by a second hole parallel to it, so that when inserting said shaft into the first hole and pushing it towards the second hole, the shaft contacts a wall of the first hole along two areas at the intersection of the two holes.

12. A kinematic mount connecting first and second components and comprising three contact elements, at least one of said elements comprising a depression in the first component and a movable protrusion in the second component, said movable protrusion comprising a shaft and a rigid bead body, said shaft connected to said second component and having an axis pointing towards a common center of said three contact elements, said bead body having a hole in it encircling the shaft, wherein the depression is configured to accept the bead body such that contact between the bead body and the depression defines a circular line or portion thereof.

13. The kinematic mount of claim 12, wherein the depression comprises a surface of revolution around a revolution axis, and whose radius changes monotonously with respect to the revolution axis.

14. The kinematic mount of claim 13, wherein the circular line is lying in a plane perpendicular to the revolution axis and is centered on it.

15. The kinematic mount of claim 12, further comprising a retaining bolt attached to the bead body in a direction perpendicular to the axis of the shaft.

16. The kinematic mount of claim 12, further comprising a shaft block, wherein the shaft is connected to the shaft block and the shaft block is coupled to the second component.

17. The kinematic mount of claim 12, wherein the depression comprises a conical block coupled to the first component.

18. The kinematic mount of claim 12, further comprising a retaining bolt attached to the shaft and extending through the bead body.

* * * * *